(12) United States Patent
Tasaka et al.

(10) Patent No.: US 8,144,789 B2
(45) Date of Patent: Mar. 27, 2012

(54) PICTURE CODING APPARATUS

(75) Inventors: Kei Tasaka, Nara (JP); Hiroshi Arakawa, Nara (JP); Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 1261 days.

(21) Appl. No.: 11/878,260

(22) Filed: Jul. 23, 2007

(65) Prior Publication Data

US 2008/0025396 A1 Jan. 31, 2008

(30) Foreign Application Priority Data

Jul. 27, 2006 (JP) .................................. 2006-205424

(51) Int. Cl.
*H04N 7/12* (2006.01)

(52) U.S. Cl. .............. 375/240.26; 375/240; 375/240.01; 130/153; 382/162; 345/589; 345/590; 345/591; 345/592; 345/593; 345/594; 345/595; 345/596; 345/597; 345/598; 345/599; 345/600

(58) Field of Classification Search ............. 375/240.26, 375/240.01, 240; 130/153; 382/162; 345/589–600
See application file for complete search history.

(56) References Cited

U.S. PATENT DOCUMENTS

| | | | |
|---|---|---|---|
| 5,963,673 A | | 10/1999 | Kodama et al. |
| 6,636,565 B1 * | | 10/2003 | Kim ........................ 375/240.27 |
| 7,075,989 B2 | | 7/2006 | Murakami et al. |
| 2002/0009141 A1 * | | 1/2002 | Yamaguchi et al. ..... 375/240.11 |
| 2004/0202245 A1 | | 10/2004 | Murakami et al. |
| 2005/0180505 A1 | | 8/2005 | Ogawa et al. |
| 2005/0249278 A1 | | 11/2005 | Sasai et al. |
| 2006/0008004 A1 | | 1/2006 | Karube et al. |
| 2006/0215763 A1 * | | 9/2006 | Morimoto et al. ....... 375/240.18 |
| 2007/0014360 A1 * | | 1/2007 | Botzko et al. ............ 375/240.16 |
| 2007/0036217 A1 * | | 2/2007 | Asano et al. ............. 375/240.14 |
| 2007/0229325 A1 | | 10/2007 | Yokose et al. |

FOREIGN PATENT DOCUMENTS

| | | |
|---|---|---|
| EP | 0 577 418 | 1/1994 |
| JP | 3-64189 | 3/1991 |
| JP | 6-22296 | 1/1994 |
| JP | 8-288860 | 11/1996 |
| JP | 09-322176 | 12/1997 |
| JP | 11-243551 | 9/1999 |
| JP | 2005-203905 | 7/2005 |
| JP | 2005-341545 | 12/2005 |
| JP | 2006-24978 | 1/2006 |
| JP | 2006-074347 | 3/2006 |
| JP | 2006-246276 | 9/2006 |
| JP | 2007-281589 | 10/2007 |

* cited by examiner

*Primary Examiner* — Edan Orgad
*Assistant Examiner* — Roderick Tolentino
(74) *Attorney, Agent, or Firm* — Wenderoth, Lind & Ponack, L.L.P.

(57) ABSTRACT

In order to improve the accuracy of a code amount estimated by using a predictive residual when coding at a low data rate, an encoder is utilized to perform picture coding processing on a picture to be coded which is an input signal, by using a technique such as H.264. Specifically, a code amount predictor predicts the code amount on the basis of an evaluation value obtained by predictive-residual code amount evaluation value generating unit, a coding-condition code amount evaluation value generating unit, and a motion-vector-information code amount evaluation value generating unit. The predicted code amount is used for controlling coding in the encoder.

21 Claims, 10 Drawing Sheets

| Sample management method | | |
|---|---|---|
| | Slice M | |
| Picture No. | Evaluation value | Actual code amount |
| 1 | 100 | 200 |
| 2 | 120 | 240 |
| 3 | 110 | 205 |
| N-5 | 105 | 200 |
| N-4 | 100 | 210 |
| N-3 | 115 | 230 |
| N-2 | 110 | 200 |
| N-1 | 120 | 245 |

FIG. 10A

| Picture No. | Amount of binary data of picture | Actual code amount of picture |
|---|---|---|
| 1 | 1000 | 2000 |
| 2 | 1200 | 2400 |
| 3 | 1100 | 2050 |
| N-5 | 1050 | 2000 |
| N-4 | 1000 | 2100 |
| N-3 | 1150 | 2300 |
| N-2 | 1100 | 2000 |
| N-1 | 1200 | 2450 |

FIG. 10B

| Slice No. | Amount of binary data of slice | Actual code amount of slice |
|---|---|---|
| 1 | 100 | 200 |
| 2 | 120 | 240 |
| 3 | 110 | 205 |
| N-5 | 105 | 200 |
| N-4 | 100 | 210 |
| N-3 | 115 | 230 |
| N-2 | 110 | 200 |
| N-1 | 120 | 245 |

FIG. 10C

| Macroblock No. | Amount of binary data of macroblock | Actual code amount of macroblock |
|---|---|---|
| 1 | 10 | 20 |
| 2 | 12 | 24 |
| 3 | 11 | 20 |
| N-5 | 10 | 20 |
| N-4 | 10 | 21 |
| N-3 | 11 | 23 |

PICTURE CODING APPARATUS

BACKGROUND OF THE INVENTION

(1) Field of the Invention

The present invention relates to a picture coding apparatus that codes picture information of moving pictures and in particular, to a picture coding apparatus that performs variable-length coding on information such as a quantized DCT coefficient and outputs the coded information.

(2) Description of the Related Art

In the moving picture coding technology, the efficiency of coding has been improved. It is becoming possible to implement a television-phone system that provides smooth moving pictures on cellular phones and to take moving pictures with high resolution using cellular phones. With the progresses in the coding technology, H.264/MPEG-4 AVC, which is the latest international standard for the moving picture compression coding technology, provides highly efficient entropy coding methods using syntax elements, such as DCT coefficients and motion vectors, which are specified to be transmitted using a syntax. Instead of simple, table-based conversion, the coding methods having high coding efficiency are used in this standard: a variable length coding referred to as Context-Adaptive Variable length Coding (CAVLC) and an arithmetic coding referred to as Context-Adaptive Binary Arithmetic Coding (CABAC). The arithmetic coding such as CABAC is said to be, in theory, capable of compressing a steady signal up to the limit. CABAC has an advantage that it is highly efficient in coding as stated above. However, it suffers from a disadvantage that the code amount cannot be known before the completion of coding. Therefore, as to data rate control, it is difficult to control coding on the basis of the code amount.

In a conventional technique, on the other hand, the code amount is estimated on the basis of a predictive residual, which is a difference signal between an original picture and a predicted picture which is calculated when picture information of moving pictures is coded.

This is described in Japanese Unexamined Patent Application Publication No. 2005-203905.

However, there is a problem that the accuracy of estimation decreases when the code amount is estimated only on the basis of predictive residuals. In other words, a coefficient component of coded information can be obtained by DCT-transformation, quantization, and coding of a predictive residual. Accordingly, in the case of coding at high data rates, coefficient components representing predictive residuals are dominant in the coded signal and there is a strong correlation between the predictive residuals and the coefficient components of coded information. Therefore, the code amount can be estimated with high accuracy, using the predictive residuals. For coding at low data rates, however, a large value as a quantization step in quantization is often selected and a skip or direct mode is often selected. When a large value as a quantization step is selected, the value of a predictive residual after quantization is small and the data amount of the predictive residual is accordingly small. In a skip mode, predictive residuals are not coded, and thus, the data amount of the predictive residuals is zero. Consequently, the ratio of coefficient components of predictive residuals to the coded information becomes low, whereas the ratio of information representing motion vectors and header information indicating coding conditions becomes high. Therefore, the accuracy of estimation of the code amount by a method using predictive residuals alone as in the conventional technique becomes low.

SUMMARY OF THE INVENTION

In light of the problem, an object of the present invention is to provide a picture coding apparatus capable of accurately estimating the code amount even in low-data-rate coding.

In order to solve the problem, the picture coding apparatus according to the present invention includes, a predictive residual calculating unit that calculates a predictive residual represented by a difference between an input picture and a predicted picture in pixel value by applying prediction processing to the input picture; a code amount predicting unit that predicts a code amount to be generated when the input picture is coded, on the basis of a value or a data amount of the calculated predictive residual, and a value or a data amount of at least one of: a coding condition which is control information indicating a condition for coding the input picture; and motion prediction information indicating motion between the input picture and a reference picture; and a coding unit that codes the input picture on the basis of the predicted code amount.

It should be noted that the present invention can be implemented as: a picture coding apparatus as described above; as a picture coding method having the characteristic units of the picture coding apparatus of the present invention as steps; and as a program that causes a computer to execute such steps. It is apparent that such a program can be distributed on a recording medium such as a CD-ROM or through a transmission medium such as the Internet.

The present invention enables the code amount to be accurately estimated, even when coding is performed at a low data rate. The present invention also enables an optimum code amount to be allocated to coded pictures by using the predicted code amount, thereby improving the subjective quality of coded pictures.

FURTHER INFORMATION ABOUT TECHNICAL BACKGROUND TO THIS APPLICATION

The disclosure of Japanese Patent Application No. 2006-205424 filed on Jul. 27, 2006 including specification, drawings and claims is incorporated herein by reference in its entirety.

BRIEF DESCRIPTION OF THE DRAWINGS

FIGS. 10A, 10B, and 10C are diagrams showing histories of sample points of the amount of binary data and the actual code amount accumulated in a history accumulating unit 46.

DESCRIPTION OF THE PREFERRED EMBODIMENT

The picture coding apparatus according to the present invention is described below with reference to the accompanying drawings.

(Embodiment)

Figure 1:
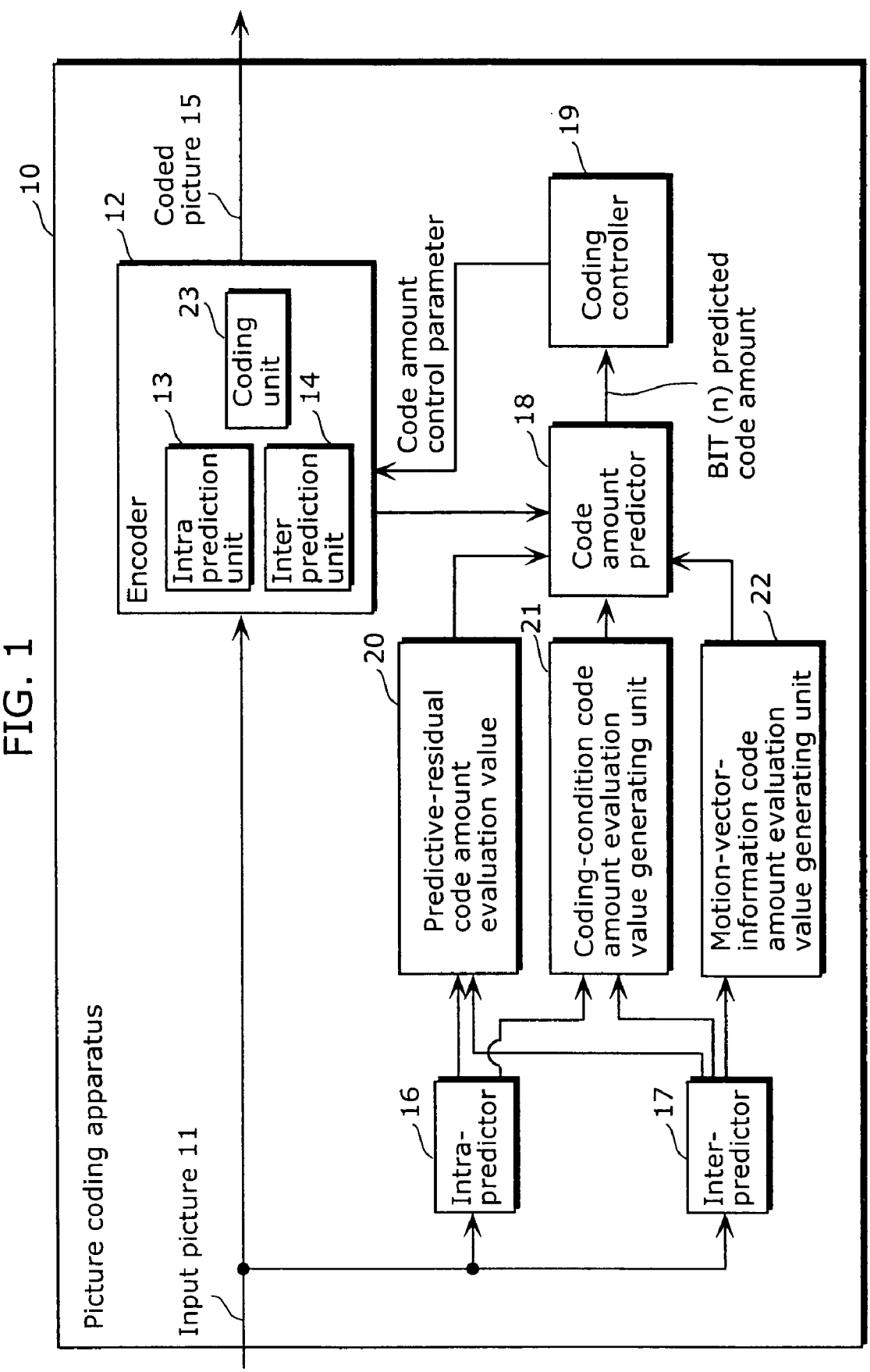
FIG. 1 is a block diagram showing a configuration of a picture coding apparatus 10 according to an embodiment of the present invention.

FIG. 1 is a block diagram showing a configuration of a picture coding apparatus 10 according to this embodiment. As shown, the picture coding apparatus 10 according to the embodiment is an apparatus that predicts the code amount on the basis of a value or a data amount of the predictive residual and a value or a data amount of at least one of a coding condition and motion prediction information to control coding and generates a coded picture 15 from an input picture 11. The picture coding apparatus 10 includes an encoder 12, an intra-predictor 16, an inter-predictor 17, a predictive-residual code amount evaluation value generating unit 20, a coding-condition code amount evaluation value generating unit 21, a motion-vector-information code amount evaluation value generating unit 22, a code amount predictor 18, and a coding controller 19. The encoder 12 includes an intra prediction unit 13, an inter prediction unit 14, and a coding unit 23. The intra prediction unit 13, inter prediction unit 14, intra-predictor 16 and inter-predictor 17 correspond to a predictive residual calculating unit that calculates a predictive residual represented by a difference between an input picture and a predicted picture in pixel value by applying prediction processing to the input picture in an aspect of the present invention. The code amount predictor 18 corresponds to a code amount predicting unit that predicts a code amount to be generated when the input picture is coded, on the basis of a value or a data amount of the calculated predictive residual, and a value or a data amount of at least one of: a coding condition which is control information indicating a condition for coding the input picture; and motion prediction information indicating motion between the input picture and a reference picture in an aspect of the present invention. The coding controller 19 and the coding unit 23 correspond to a coding unit that codes the input picture on the basis of the predicted code amount in an aspect of the present invention. The coding unit 23 corresponds to a variable-length coding unit that performs arithmetic coding on a binarized predictive residual, a coding condition, and motion vector information in an aspect of the present invention. The coding controller 19 also corresponds to the coding unit that increases a value of a quantization step used in quantizing the predictive residual when the predicted code amount exceeds a first threshold, and that decreases the value of the quantization step when the predicted code amount is equal to or smaller than a second threshold which is smaller than the first threshold in an aspect of the present invention.

The intra prediction unit 13 is a processing unit that performs intra prediction (intra-picture prediction) on input pictures and outputs predictive residuals and coding conditions resulting from the intra prediction. The inter prediction unit 14 is a processing unit that performs inter-prediction (inter-picture prediction) on input pictures and outputs predictive residuals, coding conditions, and motion vector information resulting from the inter prediction. The coding unit 23 applies orthogonal transformation processing, quantization processing, and variable length coding processing to a predictive residual inputted from the intra prediction unit 13 and the inter prediction unit 14. The coding unit 23 also applies variable length coding to a coding condition inputted from the intra prediction unit 13 and inter prediction unit 14 and motion vector information inputted from the inter prediction unit 14, and multiplexes the variable-length-coded coding conditions and motion vector information with the variable-length-coded predictive residual to output the coded picture 15. Orthogonal transformation processing is processing in which orthogonal transformation such as DCT (Discrete Cosine Transform) or fast Fourier transform is applied to input data to transform the value into an orthogonal transformation coefficient. The quantization processing is processing in which an inputted orthogonal transformation coefficient is divided by a quantization step and the result is rounded to an integer. The variable length coding processing is processing in which a quantized value obtained through the quantization processing is binarized and arithmetic coding such as CABAC is applied to the binary value. The encoder 12 changes the quantization step used by the coding unit 23 in quantization processing, in accordance with a code amount control parameter inputted from the coding controller 19. The coding unit 23 outputs, to the code amount predictor 18, an actual code amount of the coded picture 15 for each processing unit for coding, such as block, slice, or picture. When the code amount predicted by the code amount predictor 18 exceeds a first threshold, the coding controller 19 increases the quantization step used by the coding unit 23 in quantization processing by one step. When the predicted code amount is less than or equal to a second threshold (where second threshold<first threshold), the coding controller 19 decreases the quantization step used by the coding unit 23 in the quantization processing by one step.

Figure 2:
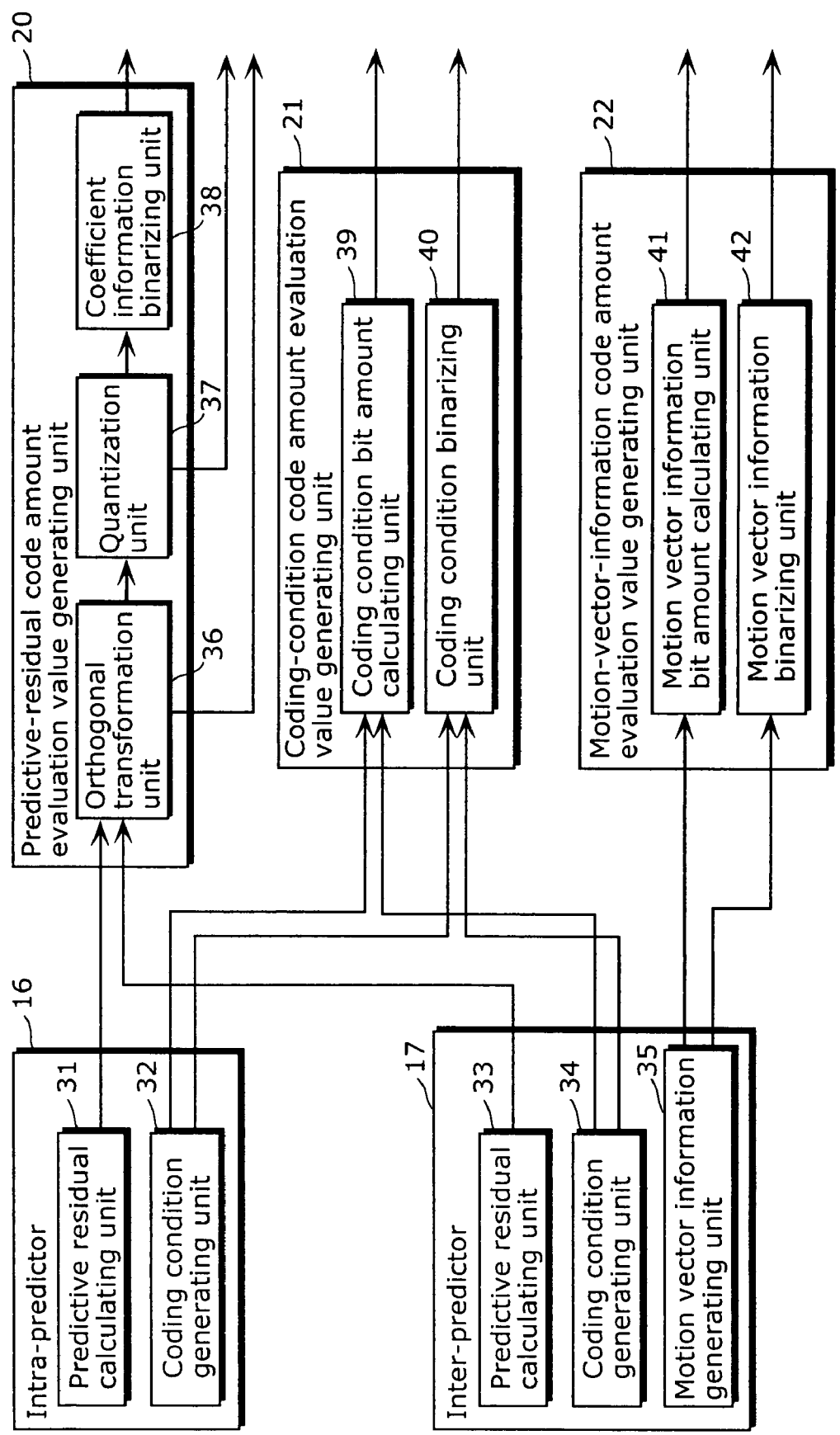
FIG. 2 is a block diagram showing, in greater detail, a configuration of an intra-predictor 16, an inter-predictor 17, a predictive-residual code amount evaluation value generating unit 20, a coding condition code amount evaluation value generating unit 21, and a motion-vector-information code amount evaluation value generating unit 22 which are shown in FIG. 1.

FIG. 2 is a block diagram showing, in greater detail, the configuration of the intra-predictor 16, inter-predictor 17, predictive-residual code amount evaluation value generating unit 20, coding-condition code amount evaluation value generating unit 21, and motion-vector-information code amount evaluation value generating unit 22. The intra-predictor 16 is a processing unit for generating an evaluation value for an input picture that results from intra prediction (intra-picture prediction). The intra-predictor 16 may perform prediction by using fewer pixels than in the intra prediction unit 13 in the encoder 12 or may merely receive data on predictive residuals and coding conditions from the intra prediction unit 13. The intra-predictor 16 includes a predictive residual calculating unit 31 and a coding condition generating unit 32 and outputs a predictive residual and a coding condition to the code amount predictor 18 (the signal line is not shown in the figure) obtained as the results of prediction. The term "evaluation value" refers to a value used for evaluating the code amount as a result of coding of an input picture. Actually, an evaluation value is a variable of a prediction function or an approximating curve representing the relationship between an evaluation value and the code amount. The predictive residual calculating unit 31 performs intra prediction on an input picture to calculate a predictive residual, which is an evaluation value. The coding condition generating unit 32 generates coding conditions representing information such as a block size, the direction of prediction, and a picture type, which are conditions for coding used when intra prediction is performed. The inter-predictor 17 is a processing unit for generating an evaluation value for an input picture that results from inter prediction (inter-picture prediction). The inter-predictor 17 may perform prediction using fewer pixels than in the inter prediction unit 14 in the encoder 12 or may only receive data on predictive residuals, coding conditions, and motion vector information. The inter-predictor 17 includes a predictive residual calculating unit 33, a coding condition generating unit 34, and a motion vector information generating unit 35 and outputs, to the code amount predictor 18, predictive residuals, coding conditions, and motion vector information which are obtained as the results of prediction (the signal line is not shown in the figure). The predictive residual calculating unit 33 performs inter prediction on an input picture to calculate a predictive residual, which is an evaluation value. The coding condition generating unit 34 generates coding conditions representing conditions for coding used when inter prediction is performed, such as a block size, the size of block used for motion search and motion compensation, a coding mode such as a direct mode or a skip mode, and a picture type. The motion vector information generating unit 35 searches, for each block to be coded, a reference picture to detect a motion vector indicating a predicted picture for which a predictive residual between images of a picture of a block to be coded and images of the reference picture is the smallest, and generates motion vector information indicating the detected motion vector.

The predictive-residual code amount evaluation value generating unit 20 is a processing unit that generates an evaluation value for the code amount from a predictive residual which is the difference between a predicted picture and an input picture. The predictive-residual code amount evaluation value generating unit 20 includes an orthogonal transformation unit 36, a quantization unit 37, and a coefficient information binarizing unit 38. The orthogonal transformation unit 36 applies orthogonal transformation to a predictive residual inputted into the predictive-residual code amount evaluation value generating unit 20 to transform the value of the predictive residual into an orthogonal transformation coefficient value. The orthogonal transformation unit 36 outputs the coefficient value obtained through the orthogonal transformation to the code amount predictor 18 as an evaluation value. The orthogonal transformation unit 36 may merely receive data from the coding unit 23 of the encoder 12. The quantization unit 37 applies quantization processing to a coefficient value inputted from the orthogonal transformation unit 36 and outputs the quantized value obtained as the result of the quantization to the coefficient information binarizing unit 38. The quantization unit 37 also outputs the quantized value obtained as the result of the quantization to the code amount predictor 18 as an evaluation value. The quantization unit 37 may merely receive data on the quantized value from the coding unit 23 of the encoder 12 or may be a processing unit that performs quantization using a fixed quantization step. The coefficient information binarizing unit 38 binarizes a quantized value inputted from the quantization unit 37 and outputs the obtained binarized data to the code amount predictor 18 as an evaluation value.

The coding-condition code amount evaluation value generating unit 21 is a processing unit that generates an evaluation value based on a coding condition and includes a coding condition bit amount calculating unit 39 and a coding condition binarizing unit 40. The coding condition bit amount calculating unit 39 calculates the bit amount of coding conditions inputted from the coding condition generating unit 32 of the intra-predictor 16 and the coding condition generating unit 34 of the inter-predictor 17 and outputs the calculated bit amount to the code amount predictor 18 as evaluation values. The coding condition binarizing unit 40 binarizes coding conditions inputted from the coding condition generating units 32 and 34 and outputs the coding conditions in binary representation to the code amount predictor 18 as evaluation values.

The motion-vector-information code amount evaluation value generating unit 22 is a processing unit that generates an evaluation value for the code amount from information representing a motion vector and a reference picture which are obtained when a predicted picture is generated. The motion-vector-information code amount evaluation value generating unit 22 includes a motion vector information bit amount calculating unit 41 and a motion vector information binarizing unit 42. The motion vector information bit amount calculating unit 41 calculates the bit amount of motion vector information inputted from the motion vector information generating unit 35 and outputs the calculated bit amount to the code amount predictor 18 as an evaluation value. The motion vector information binarizing unit 42 binarizes motion vector information inputted from the motion vector information generating unit 35 and outputs the motion vector information in binary representation to the code amount predictor 18 as an evaluation value.

Figure 3:
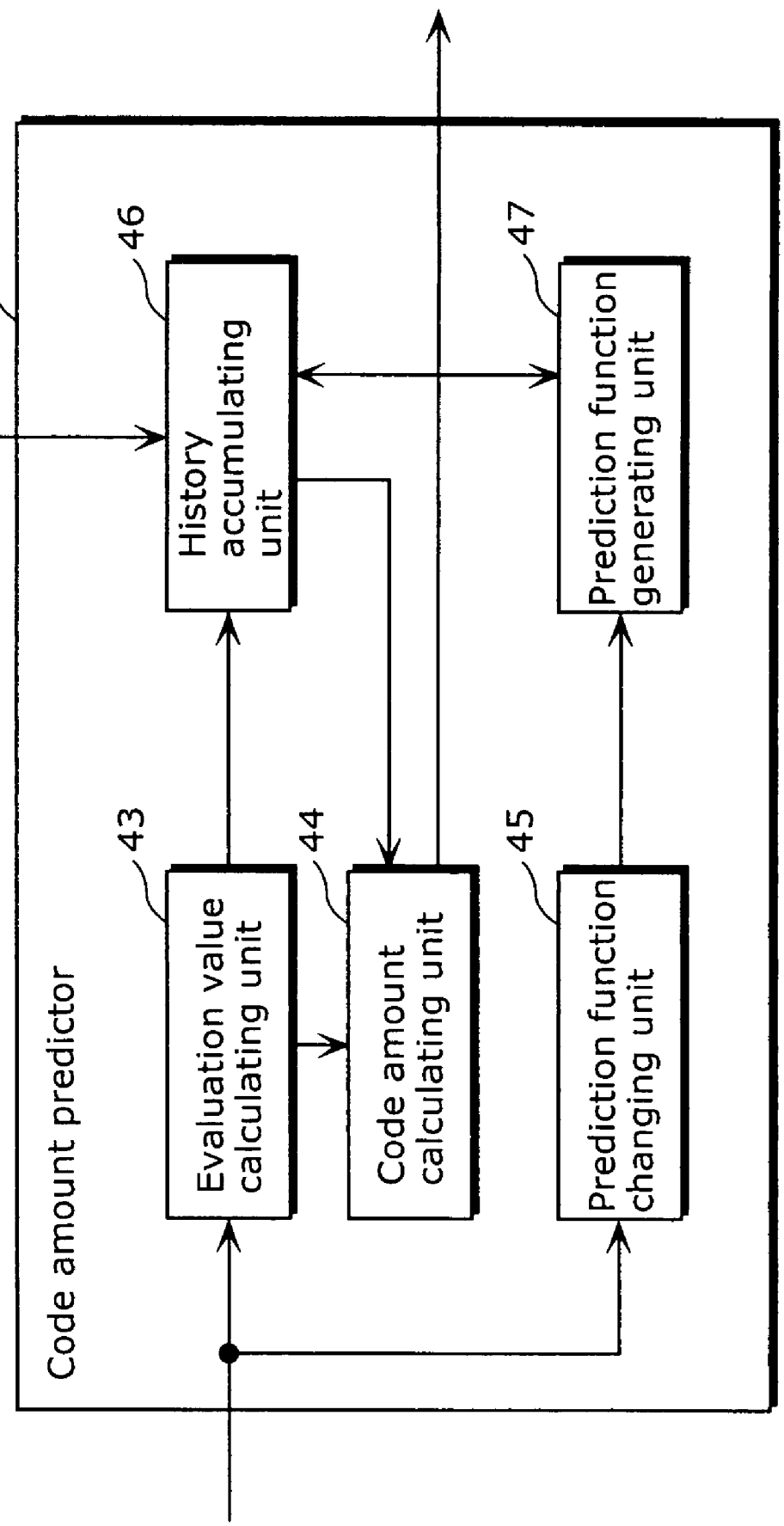
FIG. 3 is a block diagram showing, in greater detail, a code amount predictor 18 shown in FIG. 1.

FIG. 3 is a block diagram showing, in further detail, a configuration of the code amount predictor 18 shown in FIG. 1. The code amount predictor 18 includes an evaluation value calculating unit 43, a code amount calculating unit 44, a prediction function changing unit 45, a history accumulating unit 46, and a prediction function generating unit 47. The evaluation value calculating unit 43 accumulates, in the history accumulating unit 46, evaluation values inputted from the processing units shown in FIG. 2, namely the intra-predictor 16, the inter-predictor 17, the predictive-residual code amount evaluation value generating unit 20, the coding-condition code amount evaluation value generating unit 21, and the motion-vector-information code amount evaluation value generating unit 22 in association with the actual code amounts inputted from the encoder 12 to the history accumulating unit 46 for each block, slice, or picture of a picture to be coded. The evaluation value calculating unit 43 also generates an evaluation value, which is a variable, depending on a prediction function for a combination of evaluation values used for predicting the code amount of a block to be coded, and outputs the evaluation value to the code amount calculating unit 44. For example, when a coefficient outputted from the orthogonal transformation unit 36 is used as a predictive residual in intra prediction in the intra-predictor 16, the evaluation value calculating unit 43 adds an evaluation value inputted from the orthogonal transformation unit 36 to an evaluation value inputted from the coding condition generating unit 32, which is a coding condition, to obtain an evaluation value which is the variable of a prediction function.

Any of the data values of a predictive residual, coding condition and motion vector information can be used as an evaluation value because they are represented by numerical values. The greater the numerical value, the larger the bit amount used for representing the value; the smaller the numerical value, the smaller the bit amount used for representing the value. Accordingly, it can be considered that the values representing the predictive residual, coding condition, and motion vector information represent the amounts of the data. Intermediate data such as orthogonal transformation coefficients and quantized values are also numerical values and can be considered to relate to the code amount by coding. The intermediate data such as orthogonal transformation coefficients and quantized values are results of processing in the processing units subsequent to the intra-predictor 16 or the inter-predictor 17 and are therefore in closer relationship with the code amount than a predictive residual, coding condition, and motion vector information outputted from the intra-predictor 16 or the inter-predictor 17. Furthermore, the data resulting from binarization of a quantized predictive residual, a coding condition, and motion vector information can be more readily put into one-to-one relationship with the code amount. Therefore, the data values of coding conditions and motion vector information themselves and their binarized data themselves are handled as data representing the bit amount of the coding conditions and motion vector information.

Furthermore, when the amount of bits of a quantized value is used as the evaluation value for a predictive residual in inter prediction, the evaluation value calculating unit 43, for example, calculates the bit amount of the quantized value inputted from the quantization unit 37, adds the calculated bit amount, the bit amount inputted from the coding condition bit amount calculating unit 39, and the bit amount inputted from the motion vector information bit amount calculating unit 41 together so as to obtain the evaluation value which is a variable of a prediction function.

When an evaluation value inputted from the coefficient information binarizing unit 38 is used as the evaluation value for a predictive residual in intra prediction, the evaluation value calculating unit 43 adds the evaluation value to an evaluation value inputted from the coding condition generating unit 32 through the coding condition binarizing unit 40 to obtain an evaluation value which is a variable of a predictive function.

The coding amount calculating unit 44 substitutes an evaluation value inputted from the evaluation value calculating unit 43 in a prediction function accumulated in the history accumulating unit 46 to calculate the code amount for each block, slice, or picture to be coded.

The prediction function changing unit 45 refers to a coding condition inputted from the intra-predictor 16 or the inter-predictor 17, and when it is a predetermined coding condition, changes the prediction function. For changing from one prediction function to another, plural prediction functions for different conditions may be generated beforehand and accumulated in the history accumulating unit 46, or a new prediction function may be generated in each time of changing. For example, when coding of pictures having field structure is performed, the prediction function changing unit 45 may change the prediction function depending on whether a field to be coded is a first field or second field. Alternatively, the prediction function may be changed each time switching between picture types such as I, P, and B occurs. In another example, the prediction function may be changed when switching between intra prediction and inter prediction occurs.

The history accumulating unit 46 accumulates evaluation values inputted from the intra-predictor 16, the inter-predictor 17, the predictive-residual code amount evaluation value generating unit 20, the coding-condition code amount evaluation value generating unit 21, and the motion-vector-information code amount evaluation value generating unit 22 in association with the amounts of code actually generated when the same picture is coded. The actual code amount is inputted from the encoder 12. The history accumulating unit 46 also accumulates a prediction function generated by the prediction function generating unit 47 based on the history data accumulated.

The prediction function generating unit 47 generates a prediction function (regressive line) from a pair of an evaluation value accumulated in the history accumulating unit 46 and the actual code amount by using the least squares method. In the case of intra prediction, the prediction function generating unit 47 uses the sum of the value or data amount representing a predictive residual and the value or data amount representing a coding condition as the evaluation value and generates a prediction function from the pair of the evaluation value and the actual code amount. In the case of inter prediction, the prediction function generating unit 47 uses as the evaluation value the sum of the value or data amount representing a predictive residual, the value or data amount representing a coding condition and the value or data amount representing motion vector information and generates a prediction function from a pair of an evaluation value and the actual code amount. Furthermore, in skip mode of inter prediction, the prediction function generating unit 47 sets the value or data amount representing a predictive residual to "0", for example, calculates an evaluation value that is the sum of the value or data amount representing a predictive residual, the value or data amount representing a coding condition, and the value or data amount representing motion vector information, and generates a prediction function from the pair of the evaluation value and the actual code amount. In direct mode of inter prediction, the prediction function generating unit 47 sets the value or data amount representing motion vector information to "0", for example, calculates an evaluation value, and generates a prediction function.

When an evaluation value of a picture to be coded significantly differs from an average of pairs of actual code amounts and the corresponding evaluation values, the prediction function may be a line connecting the average of the pairs of actual code amounts and the evaluation values with the origin, instead of a regressive line.

Figure 4:
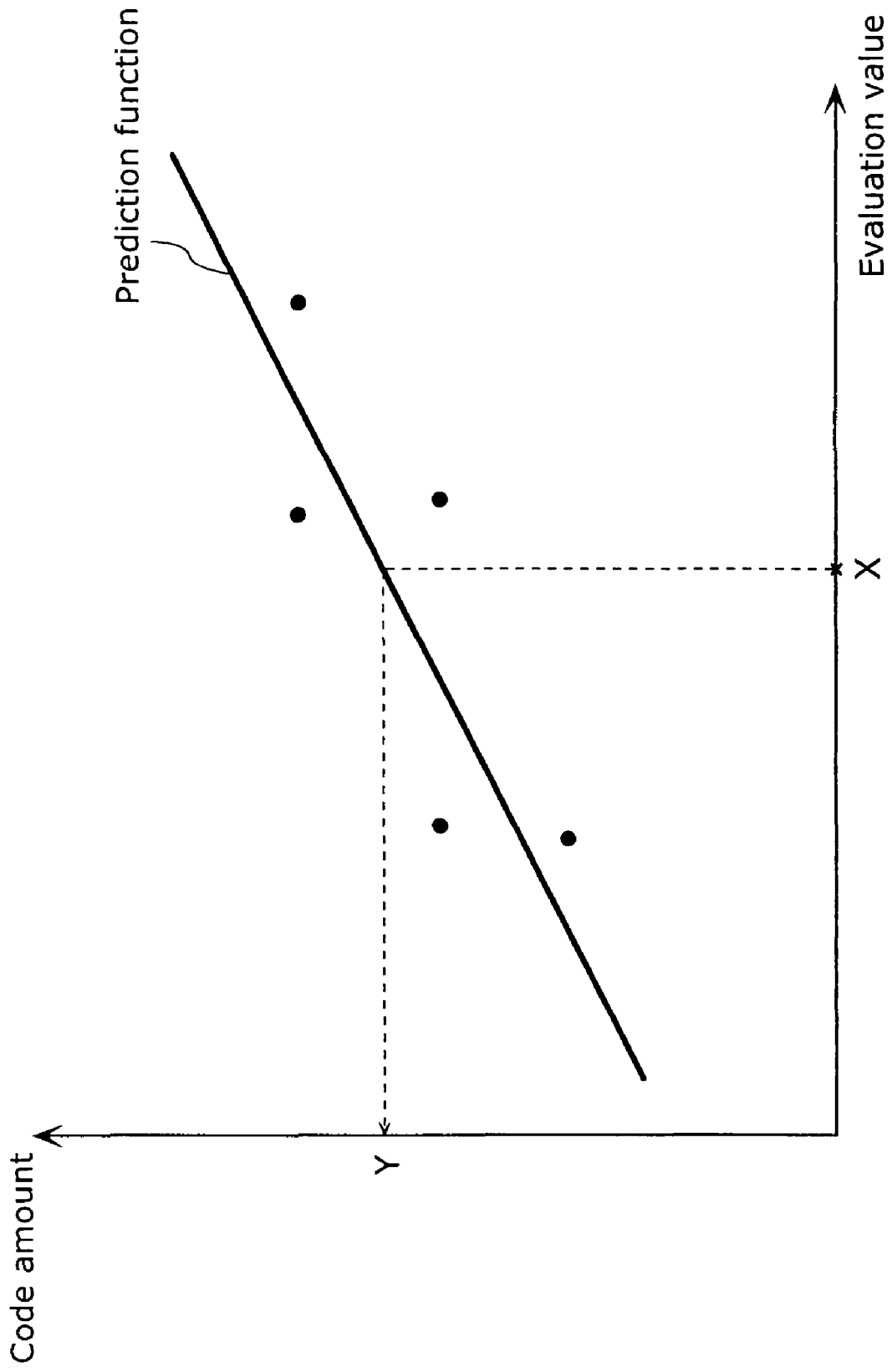
FIG. 4 is a graph showing an exemplary prediction function (regressive line) generated by the prediction function generating unit 47 shown in FIG. 3.

FIG. 4 shows an exemplary prediction function (regressive line) generated by the prediction function generating unit 47 shown in FIG. 3. The five points plotted in FIG. 4 represent pairs of evaluation values and actual code amounts of five nearest pictures (hereinafter referred to as sample points). For example, when an evaluation value inputted from the coefficient information binarizing unit 38 is used as the evaluation value for a predictive residual in intra prediction, the prediction function generating unit 47 adds the evaluation value to an evaluation value inputted from the coding condition generating unit 32 through the coding condition binarizing unit 40 to obtain an evaluation value which is a variable of the prediction function. The sample points, which are pairs of the evaluation values calculated in this way for the nearest five pictures and the code amounts actually generated by coding the five pictures, are represented by the five points. The prediction function generating unit 47 applies the least squares method to the five points to determine, as a prediction function, the regressive line that is equally distant from the five points. When the evaluation value thus calculated by the evaluation value calculating unit 43 for pictures to be coded using intra prediction is X and a value Y is obtained by assigning the value X to a variable of a prediction function, the coding amount calculating unit 44 outputs the value Y as the predicted code amount to the coding controller 19.

While an example in which the prediction function generating unit 47 generates a prediction function from the sample points of the nearest five pictures is described in FIG. 4, a prediction function may be generated by adding a sample point each time the next picture is to be coded. The same applies to a case where a sample point is calculated and a prediction function is generated for each picture (block, slice, or picture) to be coded. Alternatively, the prediction function generating unit 47 may generate a new prediction function from among the predetermined number of new sample points, rather than adding a sample point each time a picture to be coded changes. For example, a prediction function may be generated always from the sample points of the latest nearest five pictures.

Figure 5:
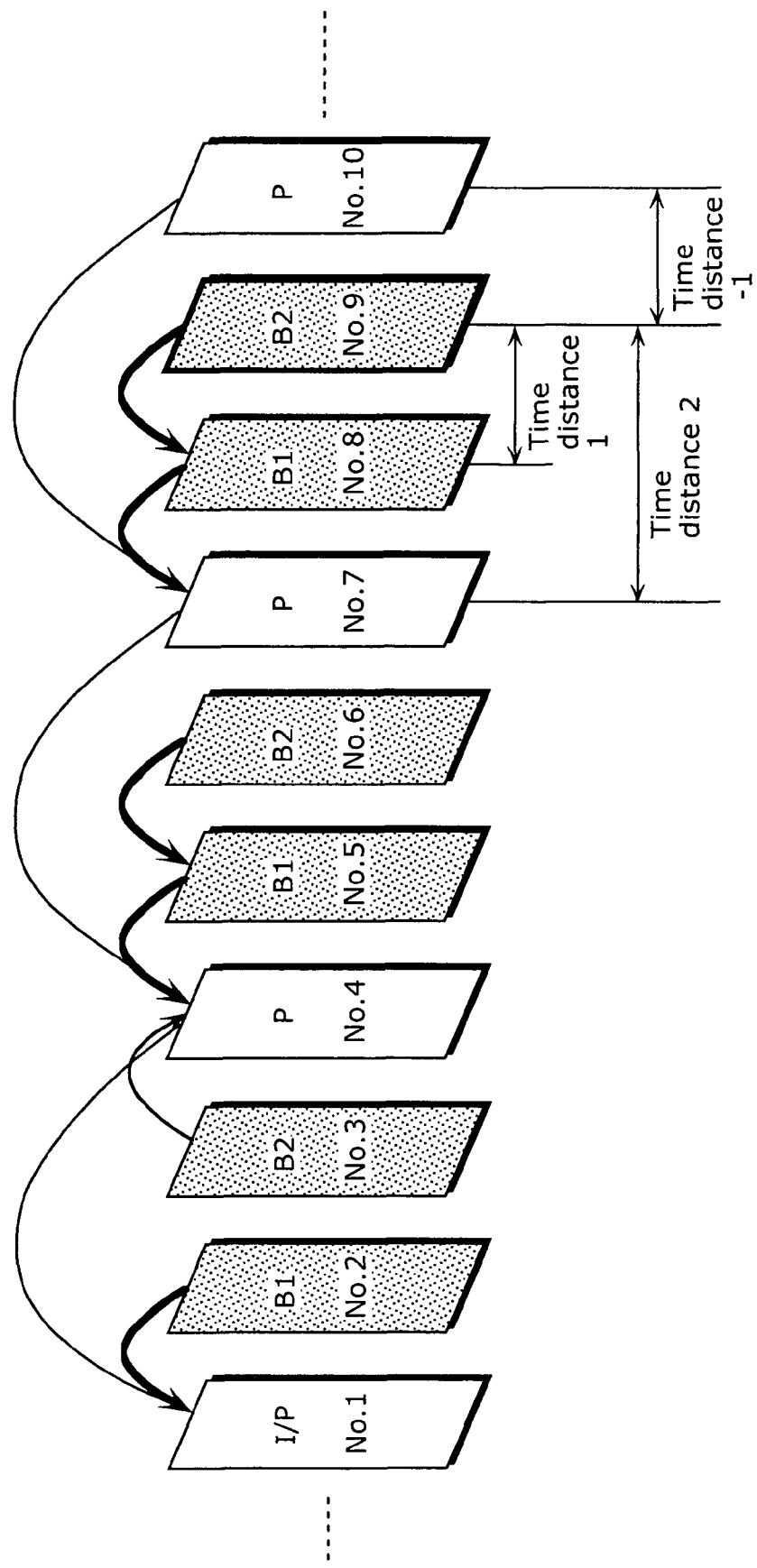
FIG. 5 is a diagram illustrating a method for changing a prediction function depending on a time distance from a picture to be coded to a reference picture.

FIG. 5 is a diagram illustrating a method for changing the prediction function depending on a time distance from a picture to be coded to a reference picture. Here, the prediction function generating unit 47 corresponds to the prediction function generating unit that accumulates a history of the evaluation values and the actual code amounts which correspond to the evaluation values for blocks to be coded that are motion predicted using a reference picture at an equal time distance from the picture to be coded, and generates a prediction function for each block which is motion predicted using a reference picture at a different time distance from the picture to be coded in an aspect of the present invention. The code amount calculating unit 44 corresponds to the code amount predicting unit that changes the prediction function depending on the time distance between a reference picture and the picture to be coded and applies the changed prediction function in an aspect of the present invention.

An example in which coding is performed using an IBBP structure is described below. In FIG. 5, frames are shown in the order in which they are displayed. It is assumed here that for the second frame B2 in the IBBP structure in FIG. 5, the preceding frames I/P and B1 and the succeeding frame P can be referred to in motion vector detection in the inter-predictor 17. The restrictions are illustrative and depend on coding specifications.

If the time distance between B2 (No. 9) and B1 (No. 8) in FIG. 5 is represented by "1", then the time distance between B2 (No. 9) and I/P (No. 7) can be represented by "2". Similarly, the time distance between B2 (No. 9) and I/P (No. 10) can be represented by "−1".

When the frame B2 (No. 9) indicated by the heavy-line box refers to B1 (No. 8), a prediction function for the time distance "1" is used to estimate the code amount; when B2 (No. 9) refers to I/P (No. 7), a prediction function for the time distance "2" is used to estimate the code amount; and when B2 (No. 9) refers to I/P (No. 10), a prediction function for the time distance "−1" is used to estimate the code amount.

Since the frame B2 (No. 9) indicted by the heavy-line box refers to the preceding frame B1 (No. 8), the prediction function for the time distance "1" is used. The prediction function for time distance "1" is generated from an evaluation value for the frame coded by using inter prediction with reference to the reference picture with a time distance of "1" before the current frame to be predicted (coded) is coded and the actual code amount (the code amount by actual coding). The prediction function may be a regression expression that indicates the relationship between the evaluation value and the actual code amount. The pictures (No. 2, No. 5, No. 6, and No. 8) with the thick arrows in the figure have referred to the reference picture with a time distance of "1" before a picture to be coded of No. 9. Therefore, for example a regressive line that satisfies the relationship among the sample points (evaluation value, actual code amount) of these pictures is used as the prediction function to estimate the code amount.

Figure 6:
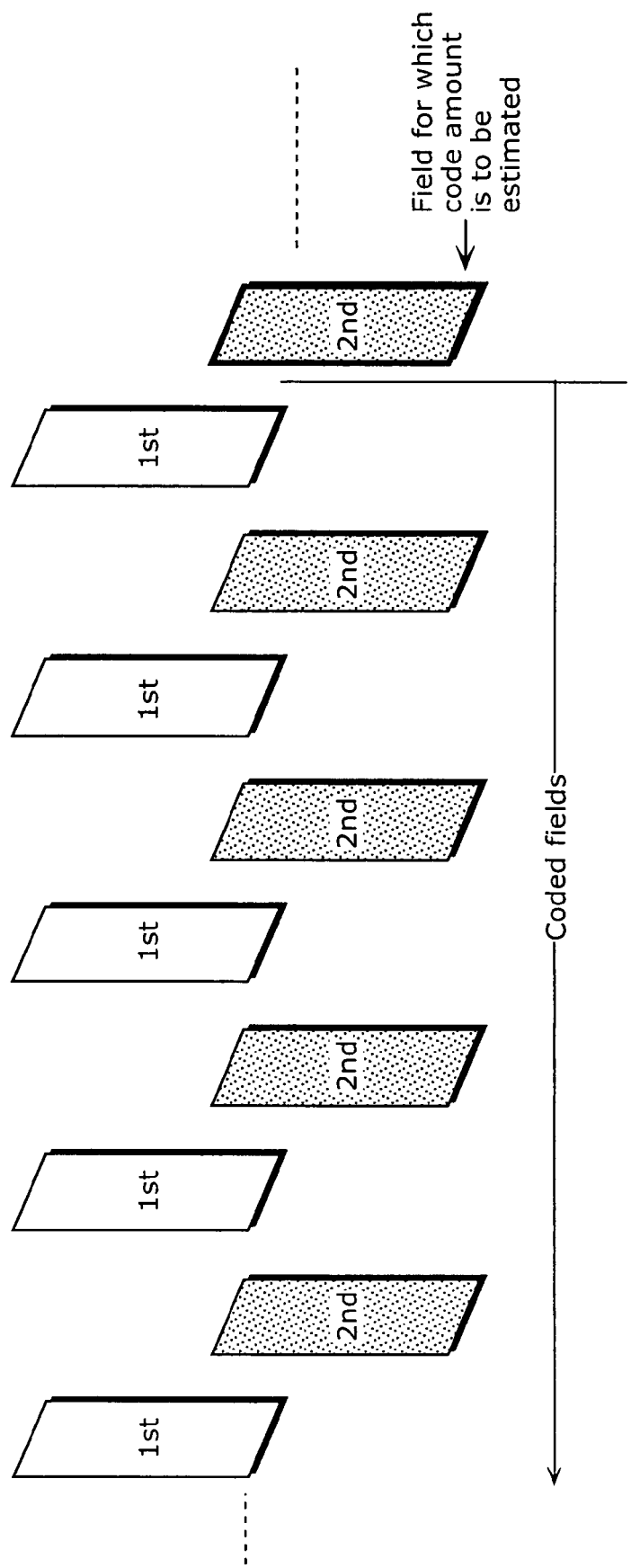
FIG. 6 is a diagram illustrating a method for changing a prediction function depending on whether a picture to be coded is a first field or a second field, when the picture to be coded is coded in a field structure.

FIG. 6 is a diagram illustrating a method for changing a prediction function depending on whether the current picture to be coded is a first field or a second field when pictures are coded using field structures. In FIG. 6, fields are shown in the order in which they are coded. It is assumed here that the second fields indicated by a heavy-line box is the current field for which the code amount is to be estimated.

In field coding, a prediction function for first field is used for estimation of the code amount of a first field and a prediction function for second field is used for estimation of the code amount of a second field. The prediction function generating unit 47 here corresponds to the prediction function generating unit which accumulates histories of the evaluation values and the actual code amounts each of which corresponds to the evaluation values, for a first field or a second field, and to generate a prediction function for each field, when a picture to be coded is interlaced-coded in an aspect of the present invention. The code amount calculating unit 44 corresponds to the code amount predicting unit that changes the prediction function depending on whether a picture to be coded is a first field or a second field and that applies the changed prediction function in an aspect of the present invention.

The prediction function for first field may be a regressive expression representing the relationship between an evaluation value for a first field coded before the current field to be predicted and the actual code amount (the code amount by actual coding). Four second fields have been coded before the current field to be coded, which is a second field in the figure. The prediction function generating unit 47 generates a prediction function representing the relationship among the sample points (evaluation value, actual code amount) of the four fields, for example. In this case, the prediction function may be curve approximation such as logarithm approximation or piecewise linear approximation using multiple linear expressions.

Figure 7:
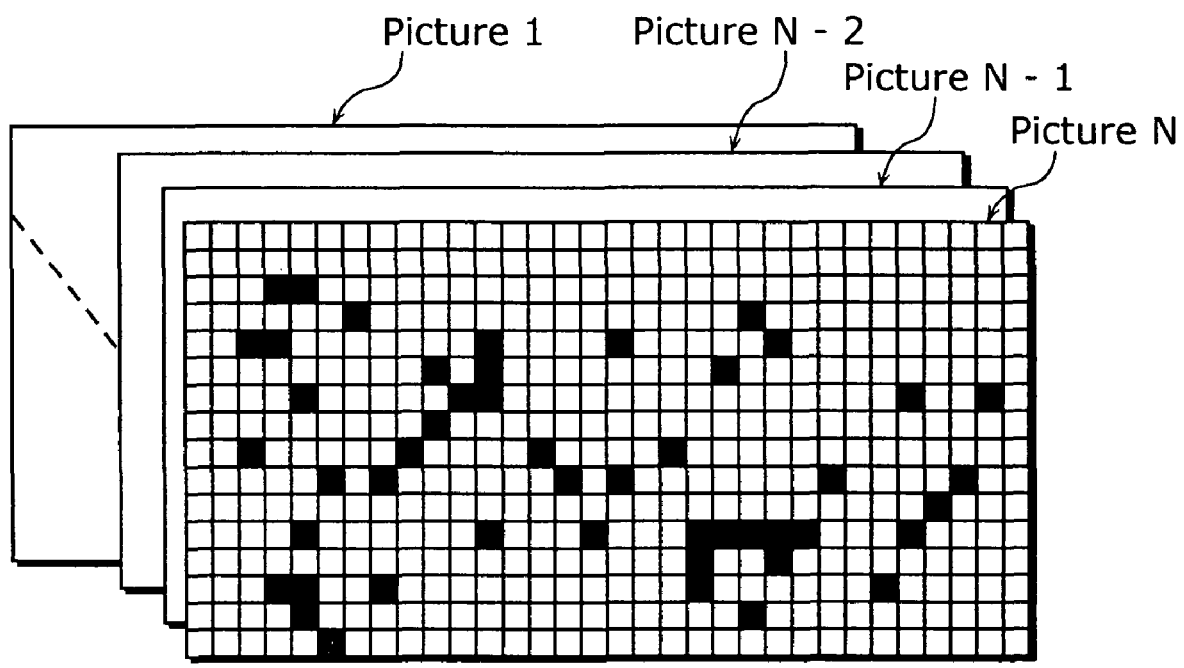
FIG. 7 is a diagram illustrating a method for changing a prediction function depending on whether a macroblock (MB) to be coded is an MB to be intra-predicted or inter-predicted.

FIG. 7 is a diagram illustrating a method for changing a prediction function depending on whether a macroblock (MB) to be coded is to be intra predicted or inter predicted. The prediction function generating unit 47 here corresponds to the prediction function generating unit which accumulates histories of the evaluation values and the actual code amounts which correspond to the evaluation values for a picture to be coded using intra-picture prediction and a picture to be coded using inter-picture prediction, and generates prediction functions for each of the pictures in an aspect of the present invention. The code amount calculating unit 44 corresponds to the code amount predicting unit which changes the prediction function depending on whether a picture to be coded is coded using intra-picture prediction or inter-picture prediction and applies the changed prediction function in an aspect of the present invention.

In FIG. 7, pictures coded by switching between intra prediction and inter prediction for each MB to be coded are shown in the order they are coded. In the description that follows, pictures are labeled picture numbers as picture 1, picture 2, picture 3, . . . , picture (N−2), picture (N−1), and picture N. The shaded blocks in picture N are MBs coded using intra prediction (intra MBs) and the other blocks are MBs coded with inter prediction (inter MBs).

When the history accumulating unit 46 manages evaluation values and actual code amounts of pictures as a history, the history accumulating unit 46 manages the sum of the values for only the intra MBs and the sum of the values for only the inter MBs in separate memory areas. They are managed by each picture number.

On the other hand, when the current MB to be coded is an intra MB, the evaluation value calculating unit 43 sums the data values or data amounts only of the intra MBs in picture N and provides the sum as an evaluation value. The prediction function generating unit 47 provides a regression expression of sample points that are pairs of the sum evaluation value and sum actual code amount of only the intra MBs in pictures 1, 2, 3, ..., N−2, N−1 as a prediction function for the intra MBs. The code amount calculating unit 44 substitutes in the prediction function the sum of the evaluation values for the intra MBs in picture N calculated by the evaluation value calculating unit 43 to calculate a predicted code amount of the intra MBs in picture N.

Similar calculations are performed for the inter MBs. Specifically, the evaluation value calculating unit 43 sums data values or data amounts of only the inter MBs in picture N and provides it as a sum evaluation value. The prediction function generating unit 47 provides as a prediction function a regressive expression of sample points that are pairs of the sum evaluation value and sum actual code amount of only the inter MBs in each of the pictures coded before picture N. The code amount calculating unit 44 substitutes in the prediction function for the inter MBs the sum evaluation value obtained by summing the data values or data amounts of only the inter MBs in picture N calculated by the evaluation value calculating unit 43 to calculate a predicted code amount of the inter MBs in picture N. The code amount calculating unit 44 adds the predicted code amount of the inter MBs in picture N to the predicted code amount of the intra MBs in picture N to obtain a predicted code amount of picture N.

By using two prediction functions to separately calculate the estimated code amount of only the intra MBs and the estimated code amount of only the inter MBs in picture N, a tendency of samples of the intra MBs and a tendency of samples of the inter MBs can be separately reflected in the estimation. Therefore, the performance of estimation of the code amount can be improved.

Figure 8:
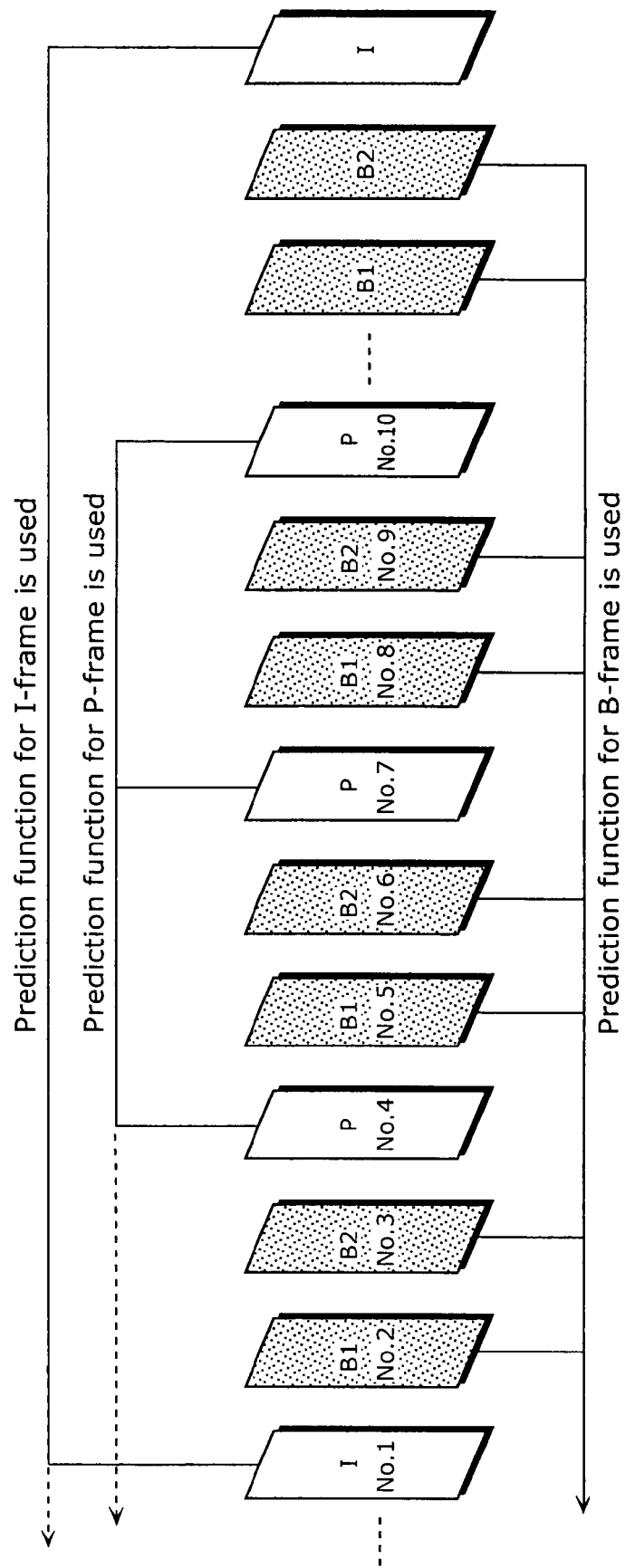
FIG. 8 is a diagram showing a method for calculating predictive code amounts by changing a prediction function depending on the type of a picture, which is indicated by I, B, or P.

FIG. 8 shows a method for calculating a predicted code amount by changing a prediction function depending on the type of picture indicated by I, B, and P. In the description that follows, an example is described in which an input picture (VIN picture to be coded) is coded using an IBBP structure. In FIG. 8, the frames are shown in the order in which they are displayed. The prediction function generating unit 47 here corresponds to the prediction function generating unit that accumulates histories of the evaluation values and the actual code amounts which correspond to the evaluation values, for each of picture types I, P, and B of a picture to be coded or for each of slice types I, P, and B of a picture to be coded, and generates the prediction functions for the types in an aspect of the present invention and the coding amount calculating unit 44 corresponds to the code amount predicting unit that changes the prediction function depending on at least one of the picture type and the slice type and to apply the changed prediction function in an aspect of the present invention.

The code amount calculating unit 44 calculates a predictive code amount by using a prediction function for I frame when an I frame is to be estimated, a prediction function for P frame when a P frame is to be estimated, and a prediction function for B frame when a B frame is to be estimated.

The prediction function for P frame may be a regression expression representing the relationship between an evaluation value for a P frame coded before the current frame to be predicted and the actual code amount (the code amount by actual coding). To estimate the code amount of a P frame (No. 10) in FIG. 8, an expression representing the relationship between the sample points of P frames No. 7 and No. 4 (evaluation value, actual code amount) is used as the prediction function. Similarly, to estimate the code amount of B2 (No. 9), an expression representing the relationship among B frames No. 8, No. 6, No. 5, No. 3, and No. 2 is used as the prediction function. Differentiation may be made between B1 and B2 frames in B frames and different prediction functions may be calculated for them.

Figures 9A, 9B:
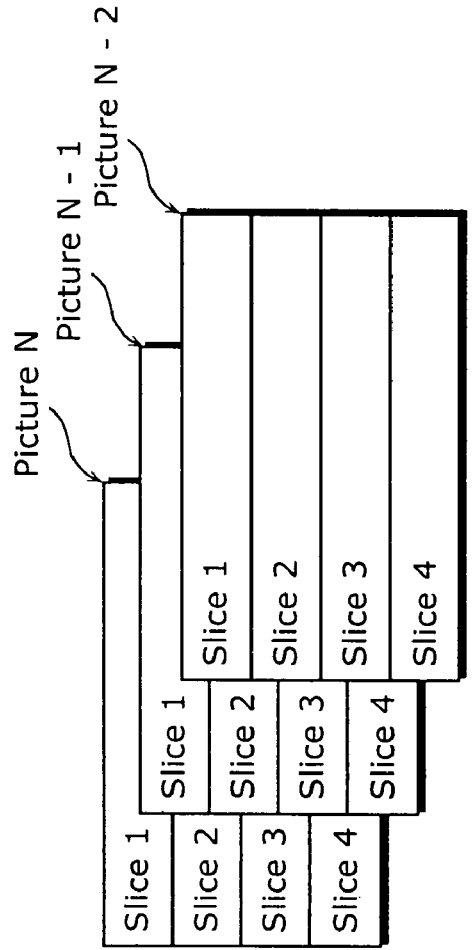
FIGS. 9A and 9B are diagrams showing a method for calculating a predictive code amount by changing a prediction function depending on the position of a slice in a picture.

FIGS. 9A and 9B are diagrams showing a method for calculating a predicted code amount by changing a prediction function depending on the position of a slice in a picture. FIG. 9A shows pictures arranged in the order in which they are coded and the positions of slices in each picture. It is assumed in the following description that picture N is the current picture for which the code amount is to be estimated and the code amount of picture N is calculated from already coded pictures (N−1), (N−2), ..., (N−5) for which evaluation values and the actual code amount have been calculated. The prediction function generating unit 47 here corresponds to the prediction function generating unit that accumulates histories of the evaluation values and the actual code amounts which correspond to the evaluation values, for each slice position in a picture, and generates a prediction function for the slice position in an aspect of the present invention, and the code amount calculating unit 44 represent the code amount predicting unit that changes the prediction function depending on a slice position in a picture and to apply the changed prediction function in an aspect of the present invention.

The code amount calculating unit 44 calculates an estimated code amount of slice 1 in picture N from a prediction function for slice 1 that represents the relationship between an evaluation value and an actual code amount of slice 1 of pictures (N−1), (N−2), ..., (N−5).

The history accumulating unit 46 manages in a memory area a pair of evaluation value and actual code amount (sample point) for each of four slices into which a picture is divided depending on the position of the slice. For example, when the code amount of slice 1 of picture N is to be estimated, a regression expression representing the relationship between the evaluation value and actual code amount shown in the figure is used as a prediction function for slice 1.

The prediction function used in FIG. 9B is a regression line of the sample points (evaluation value, actual code amount) of slice M with picture numbers from 1 to (N−1). While a regression line is used here, an approximation line or a logarithm approximation curve in which intercepts are omitted may be used. The sample points of all pictures with picture numbers 1 to N−1 that have been coded before slice M or a combination of any samples may be used. For example, the nearest five samples (with picture numbers N−1, N−2, N−3, N−4, and N−5) may be used to calculate a regressive line by the least squares method. The prediction function for slice 1 that is a regressive line obtained from the nearest five samples is denoted by S1 (v). This indicates a function having an evaluation value v as a parameter.

When x1 is the evaluation value for slice 1 of picture N and p1 is the estimated code amount, the estimated code amount of slice 1 of the current picture N to be estimated is as follows:

$$p1=S1(x1)$$

Similarly, the estimation code amount of slice m (m=1, 2, 3, 4) of picture N is as follows:

$$pm=Sm(xm)$$

Similarly, the code amount calculating unit 44 calculates estimated code amounts of slices 2, 3, and 4 of picture N from prediction functions for slices 2, 3, and 4, respectively, which indicate the relationship between the evaluation values and actual code amounts of slices 2, 3, and 4 of pictures (N−1), (N−2), . . . , (N−5). The calculated predictive code amounts of slices 1, 2, 3, and 4 are added together to yield the code amount of picture N.

A picture is a frame or field that is a single picture area to be coded. A slice is a part of a picture obtained by horizontally dividing the picture into several number of regions. Furthermore, a slice is made up of a set of macroblocks. A macroblock is an area made up of several pixels by several pixels in conventional coding.

The pictures are labeled picture numbers as pictures 1, 2, . . . , N in the order in which they are coded. Slices of a picture are labeled as slices 1, 2, . . . , N, starting from the top of the picture. Macroblocks of a slice are labeled as macroblocks 1, 2, . . . , N, starting from the far-left block of the slice.

FIGS. 10A, 10B, and 10C show histories of sample points accumulated in the history accumulating unit 46, each of which is made up of the amount of binary data and the actual code amount. FIG. 10A shows an example in which sample points are calculated in units of pictures. FIG. 10B shows an example in which sample points are calculated in units of slices. FIG. 10C shows an example in which sample points are calculated in units of macroblocks. The coefficient information binarizing unit 38, the coding condition binarizing unit 40, and the motion vector information bit amount calculating unit 41 here represent a binarizing unit that binarizes a value of the predictive residual, and a value of at least one of: the coding condition and the motion prediction information, on a picture-by-picture basis, slice-by-slice basis, or macroblock-by-macroblock basis in an aspect of the present invention. The prediction function generating unit 47 corresponds to the prediction function generating unit that selects one of the binarized data amounts as the evaluation value to accumulate a history of the evaluation value and the actual code amount which corresponds to the evaluation value, and generates a prediction function in an aspect of the present invention. The code amount calculating unit 44 corresponds to the code amount predicting unit that changes the prediction function depending on any of the binarized data amounts and applies the changed prediction function in an aspect of the present invention.

As shown in FIGS. 10A, 10B, and 10C, a prediction function can be generated for each picture, slice, and macroblock by using the amount of binary data and the actual code amount of each picture. For example, to predict the code amount of picture N, sample points shown in FIG. 10A can be used to calculate a prediction function representing the relationship between the amount of binary data and the actual code amount of each of pictures (N−1), (N−2), . . . , 1 and the calculated prediction function can be used to predict the code amount for the picture. Furthermore, sample points shown in FIG. 10B can be used to calculate a prediction function representing the relationship between the amount of binary data and actual code amount of each of slices (M−1), (M−2), . . . , 1 and the calculated prediction function can be used to predict the code amount for the slice. Similarly, sample points shown in FIG. 10C can be used to calculate a prediction function representing the relationship between the amount of binary data and the actual code amount of each of macroblocks (L−1), (L−2), . . . , 1 and the calculated prediction function can be used to predict the code amount for the macroblock.

The prediction function is a regression line of the sample points (amount of binary data, actual code amount) of pictures 1 to N−1 for example when the code amount is to be predicted at picture level. When the code amount is to be predicted at slice level, a regression line of the sample points (the amount of binary data, actual code amount) of slices 1 to M−1 is used. When the code amount is to be predicted at macroblock level, a regression line of the sample points (the amount of binary data, actual code amount) of macroblocks 1 to L−1 is used. While the regression line is used here, an approximation line or logarithm approximation curve in which intercepts are omitted may be used instead. Sample points may be all of pictures 1 to N−1 or may be a combination of any samples. For example, five samples (pictures N−1, N−2, N−3, N−4, and N−5) nearest to picture N may be used to calculate a regression line by the least squares method. The same applies to prediction of the code amount at slice level or macroblock level.

The accuracy of prediction can be improved by selecting and using only those pictures of the same type as the picture for which the code amount is to be estimated to calculate a prediction function. To estimate the code amount of a P picture, samples of P-picture-type are selected from among pictures 1 to N−1. Then a regression line of the selected samples is calculated. The coefficient information binarizing unit 38, the coding condition binarizing unit 40, and the motion vector information bit amount calculating unit 41 here represent the binarizing unit that binarizes the values on a picture-by-picture basis in an aspect of the present invention and the prediction function generating unit 47 represent the prediction function generating unit that generates a line, as a prediction function, which connects, with a coordinate origin, a coordinate point represented by a pair of the average of the evaluation values and the average of the generated code amounts by assuming, as the evaluation value, the data amount of a binarized coded picture belonging to the same picture type as the binarized picture, based on a plurality of histories of the evaluation values and the corresponding actual code amounts in an aspect of the present invention.

A prediction function can be calculated for slices and macroblocks in the same way. In the case of slices, samples in the same picture or a different picture can be used. When temporal correlation is higher, using samples in a different picture improves the accuracy; when spatial correlation is higher, using samples in the same picture to generate a predictive function improves the accuracy of estimation. The same applies to estimation at macroblock level.

When a rapid change in luminance, such as a scene change or a flash, occurs, the amount of binary data may significantly change. In such a case, a deviation from the trend of the past picture samples can occur, significantly degrading the accuracy of estimation. This is especially problematic in the example given above in which five samples nearest to picture N are used. In such a case, other samples are searched for a sample whose binary data amount is close to that of picture N and a prediction function is calculated from only that sample. This method can achieve a higher accuracy of estimation than in the method described above. In this case, the ratio between the amount of binary data and the actual code amount is used as the prediction function. The amount of binary data of picture N whose code amount is to be estimated is multiplied by the ratio to obtain the estimated code amount. One or more samples whose code amounts are close to that of picture N may be used. When multiple samples are used, the average of the ratios between the amount of binary data and actual code amount of the multiple samples and a regression line may also be used.

For several pictures immediately after the start of coding or a scene change, the past trend may not be available because a sufficient data amount is not yet present when multiple histories of evaluation values and the actual code amounts which correspond to the evaluation values are used. In such and other cases, when multiple histories of evaluation values and the actual code amounts which correspond to the evaluation values are not or can not be used in generation of a prediction function, a prediction function generated beforehand by using statistical information obtained by using coding simulation may be used. Also in such cases, using a prediction function obtained before coding is started can improve the performance of estimation of code amount. This method allows generation of a prediction function to be omitted when computational resources are scarce. This is especially advantageous when there are restrictions on a hardware implementation or the throughput of software is limited.

Specifically, coding simulation is performed beforehand and multiple histories of the resulting evaluation values and the actual code amounts which correspond to the evaluation values are used to generate a prediction function beforehand. The generated prediction function is accumulated in a memory area such as a ROM and is read as required. The evaluation value calculating unit 43 in this mode corresponds to an evaluation value calculating unit that calculates a value or a data amount, as an evaluation value, of a pair of: the predictive residual; and at least one of the coding condition and the motion prediction information in an aspect of the present invention. The prediction function generating unit 47 and the memory area such as the history accumulating unit 46 and ROM represent a prediction function generating unit that generates a prediction function representing a relationship between the evaluation value and the code amount by using statistical information obtained beforehand by coding simulation and holds the prediction function in an aspect of the present invention. The code amount predictor 18 corresponds to a code amount predicting unit that predicts the code amount of the input picture by applying the prediction function generated before coding is started to the calculated evaluation value for a current block to be coded in an aspect of the present invention.

The coding simulation as used herein refers to using multiple input pictures to actually perform coding on a picture coding apparatus to collect experimental data. Then, multiple histories of evaluation values resulting from the coding simulation performed beforehand and their corresponding actual code amounts are used to calculate the ratio between each evaluation value and code amount (herein after referred to as the code amount ratio). The code amount ratio is used as the prediction function here.

(Estimated code amount)=(code amount ratio)×(evaluation value)   Equation of prediction function By multiplying the code amount ratio by an evaluation value for the current block to be coded, an estimated code amount can be obtained. By obtaining the code amount ratio for each coding condition beforehand, more adaptive estimation of the code amount can be made even though the prediction function obtained before coding is started is used. Here, the prediction function generating unit 47 corresponds to the prediction function generating unit that generates and holds prediction functions representing each relationship between evaluation values and generated code amounts for each coding condition, by using the statistical information in an aspect of the present invention. The code amount predicting unit 18 corresponds to the code amount predicting unit that predicts, for each coding condition for the current block to be coded, the code amount of the input picture by applying, to the evaluation value, a prediction function which corresponds to the coding condition and which has been generated before coding processing in an aspect of the present invention.

Exemplary coding conditions are given below. In the example described below, a quantization step is used as a coding condition for which the code amount ratio is to be obtained and the sum of the value of a predictive residual, the value of the coding condition, and the value of motion information is used as an evaluation value.

TABLE 1

| Coding condition (Quantization step) | Average code amount ratio |
|---|---|
| 10 | 0.5 |
| 15 | 0.6 |
| 20 | 0.7 |
| 25 | 0.8 |
| 35 | 0.9 |
| 40 | 1 |

The table shows the relationship between a quantization step statistically obtained by performing coding simulation beforehand and the average code amount ratio. Hereinafter the table is referred to as the "code amount ratio table". The first row of the code amount ratio table indicates that the average of code amount ratios resulting from coding simulation in which the quantization step is set to "10" is 0.5.

When the quantization step of the current block to be coded is "20" and the evaluation value for that block is "1,000", then the estimated code amount can be obtained as follows.
(1) The value of the code amount ratio in the prediction function equation is read from a memory area associated with the quantization step "20" in the code amount ratio table. (The code amount ratio table is accumulated in a memory such as a ROM).
(2) The read value is multiplied by the evaluation value. (In the example, the code amount ratio for the quantization step "20" is 0.7.)

Estimated code amount=0.7×1,000=700 [bits]

(3) The estimated code amount of 700 bits is returned to a rate control unit.

While the code amount ratios for quantization steps are shown as the code amount ratio table here, the code amount ratios for quantization parameters may be used or a combination of other coding conditions may be used. An example of a combination of coding conditions may be an intra-picture or inter-picture prediction and quantization step. Relationships between quantization step and average code amount ratio are separately collected for each of intra prediction and inter prediction. For each prediction type, the code amount ratio multiplied by evaluation value is provided as the estimated code amount. By classifying prediction functions by coding condition in this way, the accuracy of estimation of the code amount can be improved.

While the ratio of the code amount is used as the prediction function in the example described, the prediction function is not limited to the ratio of the code amount. Other prediction function may be used.

The functional blocks in the block diagrams (such as FIGS. 1, 2, and 3) are typically implemented as LSIs, which are integrated circuits. They may be implemented on separate chips or all or part of them may be integrated in one chip. (For example the functional blocks except memory may be integrated into one chip.)

While the term "LSI" is used in the foregoing, it is sometimes referred to as an IC (Integrated Circuit), system LSI, super LSI, or ultra LSI, depending on the integration degree.

The method for integrating functional blocks is not limited to the LSI. They may be implemented by specialized circuits or general-purpose processors. FPGAs (Field Programmable Gate Arrays) which can be programmed after the manufacture of the LSIs or reconfigurable processors in which circuit cell connections and settings in the LSIs can be reconfigured may also be used.

When an integrated circuit technology that replaces the LSI technology emerges in the future thanks to advances in the semiconductor technology or derived technologies, the technology may be used to integrate the functional blocks. Application of biotechnology may be one possibility.

Furthermore, the unit for storing data to be coded or decoded among the functional blocks may be implemented as a separate unit, rather than integrated into one chip.

Industrial Applicability

The picture coding apparatus according to the present invention is useful as a picture coding apparatus provided in a personal computer having the capability of telecommunication, a PDA, a digital broadcast station, and a cellular phone.

What is claimed is:

1. A picture coding apparatus controlling coding by predicting a code amount, said picture coding apparatus comprising:
a predictive residual calculating unit including a processor calculating a predictive residual by applying prediction processing to an input picture, the predictive residual being calculated according to a difference in pixel value between the input picture and a predicted picture;
a code amount predicting unit predicting a code amount to be generated when the input picture is coded, the code amount being predicted based on (i) one of a value and a data amount of the calculated predictive residual, and (ii) one of a value and a data amount of at least one of: (a) a coding condition indicating a condition for coding the input picture; and (b) motion prediction information indicating motion between the input picture and a reference picture; and
a coding unit coding the input picture based on the predicted code amount,
wherein said coding unit increases a value of a quantization step used in quantizing the predictive residual when the predicted code amount exceeds a first threshold, and decreases the value of the quantization step when the predicted code amount is equal to or smaller than a second threshold which is smaller than the first threshold, and
wherein the coding condition is at least one of a block size, a direction of prediction, a picture type, a direct coding mode and a skip coding mode.

2. The picture coding apparatus according to claim 1, wherein said coding unit includes a variable-length coding unit performing arithmetic coding on a binarized predictive residual, a coding condition, and motion vector information.

3. The picture coding apparatus according to claim 1, wherein said code amount predicting unit includes:
an evaluation value calculating unit calculating a value or a data amount, as an evaluation value, of a pair of: the predictive residual; and at least one of the coding condition and the motion prediction information; and
a prediction function generating unit generating a prediction function representing a relationship between the evaluation value and the code amount, the prediction function being predicted based on a history of the evaluation value and a corresponding actual code amount with respect to an input picture, and
wherein said code amount predicting unit predicts the code amount of the input picture by applying the prediction function to the calculated evaluation value.

4. The picture coding apparatus according to claim 1, wherein said code amount predicting unit includes:
an evaluation value calculating unit calculating a value or a data amount, as an evaluation value, of a pair of: the predictive residual; and at least one of the coding condition and the motion prediction information; and
a prediction function generating unit (i) generating a prediction function representing a relationship between the evaluation value and the code amount, the prediction function being generated using statistical information previously obtained by coding simulation and (ii) holding the prediction function, and
wherein said code amount predicting unit predicts the code amount of the input picture by applying the prediction function generated before coding processing to the calculated evaluation value for a current block to be coded.

5. The picture coding apparatus according to claim 4, wherein said prediction function generating unit generates prediction functions representing each relationship between evaluation values and generated code amounts for each coding condition, by using the statistical information, and holds the prediction functions, and
wherein said code amount predicting unit predicts, for each coding condition for the current block to be coded, the code amount of the input picture by applying, to the evaluation value, a prediction function which corresponds to the coding condition and which has been generated before coding processing.

6. The picture coding apparatus according to claim 3, wherein said prediction function generating unit generates a prediction function representing the relationship between the evaluation value and the actual code amount corresponding to the evaluation value by using a least squares method, based on a plurality of histories of evaluation values and actual code amounts.

7. The picture coding apparatus according to claim 3, wherein said prediction function generating unit generates, as the prediction function, a line connecting, with a coordinate origin, a coordinate point represented by a pair of an average of evaluation values and an average of generated code amounts, based on a plurality of histories of the evaluation values and actual code amounts respectively corresponding to the evaluation values.

8. The picture coding apparatus according to claim 3, wherein said prediction function generating unit generates the prediction function based on a history of evaluation values for a predetermined number of nearest pictures in the past and actual code amounts respectively corresponding to the evaluation values.

9. The picture coding apparatus according to claim 3, wherein said code amount predicting unit is predicts the code amount of a block to be coded by applying the prediction function to an evaluation value calculated from at least one of the coding condition and the motion prediction information for the block to be coded, when the block to be coded is coded in the skip coding mode.

10. The picture coding apparatus according to claim 3, wherein said code amount predicting unit predicts the code amount of a block to be coded by applying the prediction function to an evaluation value calculated from at least one of the predictive residual and the coding condition for the block to be coded, when the block to be coded is coded in the direct coding mode.

11. The picture coding apparatus according to claim 3, wherein said prediction function generating unit accumulates histories of evaluation values and actual code amounts corresponding to the evaluation values for blocks to be coded that are motion predicted using a reference picture at an equal time distance from a picture to be coded, and generates a prediction function for each block which is motion predicted using a reference picture at a different time distance from the picture to be coded, and wherein said code amount predicting unit changes the prediction function depending on a time distance between a reference picture and the picture to be coded and applies the changed prediction function.

12. The picture coding apparatus according to claim 3, wherein said prediction function generating unit accumulates histories of evaluation values and actual code amounts corresponding to the evaluation values respectively, for a first field or a second field, and generates a prediction function for each field, when a picture to be coded is interlaced-coded, and wherein said code amount predicting unit changes the prediction function depending on whether a picture to be coded is the first field or the second field and applies the changed prediction function.

13. The picture coding apparatus according to claim 3, wherein said prediction function generating unit accumulates histories of evaluation values and actual code amounts corresponding to the evaluation values for a block to be coded using intra-picture prediction and a block to be coded using inter-picture prediction, and generates prediction functions for each of the intra-picture prediction and the inter-picture prediction, and wherein said code amount predicting unit changes the prediction function depending on whether the block to be coded is coded using the intra-picture prediction or the inter-picture prediction and applies the changed prediction function.

14. The picture coding apparatus according to claim 3, wherein said prediction function generating unit accumulates histories of evaluation values and actual code amounts corresponding to the evaluation values, for each of picture types I, P, and B of a picture to be coded or for each of slice types I, P, and B of a picture to be coded, and generates the prediction functions for each of the picture types and the slice types, and wherein said code amount predicting unit changes the prediction function depending on at least one of the picture type and the slice type and applies the changed prediction function.

15. The picture coding apparatus according to claim 3, wherein said prediction function generating unit accumulates histories of evaluation values and actual code amounts corresponding to the evaluation values, for each combination of any combination of (a) a time distance between a reference picture and a picture to be coded, (b) an interlaced field, (c) a distinction between intra-picture prediction and inter-picture prediction, and (d) a picture type or a slice type, and generates prediction functions for each combination, and wherein said code amount predicting unit changes the prediction function depending on the combination and applies the changed prediction function.

16. The picture coding apparatus according to claim 3, wherein said prediction function generating unit accumulates histories of evaluation values and actual code amounts corresponding to the evaluation values, for each slice position in a picture, and generates a prediction function for each slice position, and wherein said code amount predicting unit changes the prediction function depending on a slice position in a picture and applies the changed prediction function.

17. The picture coding apparatus according to claim 3, wherein said prediction function generating unit includes a binarizing unit binarizing a value of the predictive residual, and a value of at least one of the coding condition and the motion prediction information, on a picture-by-picture basis, slice-by-slice basis, or macroblock-by-macroblock basis, wherein said prediction function generating unit selects one of a binarized data amount resulting from the binarizing unit binarizing as the evaluation value to accumulate a history of the evaluation value and the actual code amount corresponding to the evaluation value, and generates a prediction function, and wherein said code amount predicting unit changes the prediction function depending on any of the binarized data amounts and applies the changed prediction function.

18. The picture coding apparatus according to claim 17, wherein said binarizing unit performs the binarizing on a picture-by-picture basis, and wherein said prediction function generating unit is generates a line, as a prediction function, which connects, with a coordinate origin, a coordinate point represented by a pair of an average of the evaluation values and an average of generated code amounts by assuming, as the evaluation value, the data amount of a binarized coded picture belonging to a same picture type as the binarized picture, based on a plurality of histories of the evaluation values and the corresponding actual code amounts.

19. The picture coding apparatus according to claim 18, wherein said prediction function generating unit is operable to generate the prediction function when a difference between a current evaluation value and the previous evaluation value exceeds a predetermined threshold.

20. A picture coding method of using a picture coding apparatus to control coding by predicting a code amount, said picture coding method comprising:

calculating, via the picture coding apparatus, a predictive residual by applying prediction processing to an input picture, the predictive residual being calculated according to a difference in pixel value between the input picture and a predicted picture;

predicting, via the picture coding apparatus, a code amount to be generated when the input picture is coded, the code amount being predicted based on of (i) one of a value and a data amount of the calculated predictive residual, and (ii) one of a value and a data amount of at least one of: (a) a coding condition indicating a condition for coding the input picture; and (b) motion prediction information indicating motion between the input picture and a reference picture; and coding, via the picture coding apparatus, the input picture based on the predicted code amount, wherein said coding increases a value of a quantization step used in quantizing the predictive residual when the predicted code amount exceeds a first threshold, and decreases the value of the quantization step when the predicted code amount is equal to or smaller than a second threshold which is smaller than the first threshold, and wherein the coding condition is at least one of a block size, a direction of prediction, an picture type, a direct coding mode and a skip coding mode.

21. A non-transitory computer-readable recording medium having a program recorded thereon, the program being for a picture coding apparatus which controls coding by predicting a code amount, and the program causing a computer to execute a method comprising:

calculating a predictive residual by applying prediction processing to an input picture, the predictive residual being calculated according to a difference in pixel value between the input picture and a predicted picture;

predicting a code amount to be generated when the input picture is coded, the code amount being predicted based on (i) one of a value and a data amount of the calculated predictive residual, and (ii) one of a value and a data amount of at least one of: (a) a coding condition indicating a condition for coding the input picture; and (b) motion prediction information indicating motion between the input picture and a reference picture; and coding the input picture based on the predicted code amount, wherein said coding increases a value of a quantization step used in quantizing the predictive residual when the predicted code amount exceeds a first threshold, and decreases the value of the quantization step when the predicted code amount is equal to or smaller than a second threshold which is smaller than the first threshold, and wherein the coding condition is at least one of a block size, a direction of prediction, an picture type, a direct coding mode and a skip coding mode.

* * * * *